Figure 1:
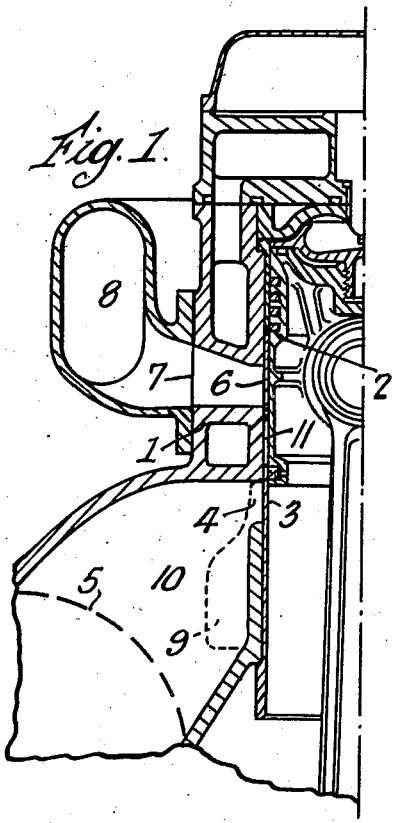

Dec. 8, 1942.   G. S. KAMMER   2,304,694
SCAVENGING OF TWO-STROKE SLEEVE VALVE INTERNAL COMBUSTION ENGINE
Filed Aug. 1, 1941   6 Sheets-Sheet 1

Inventor:
George Stephen Kammer,
By his attorneys,
Baldwin & Wight

Dec. 8, 1942. G. S. KAMMER 2,304,694
SCAVENGING OF TWO-STROKE SLEEVE VALVE INTERNAL COMBUSTION ENGINE
Filed Aug. 1, 1941 6 Sheets-Sheet 2
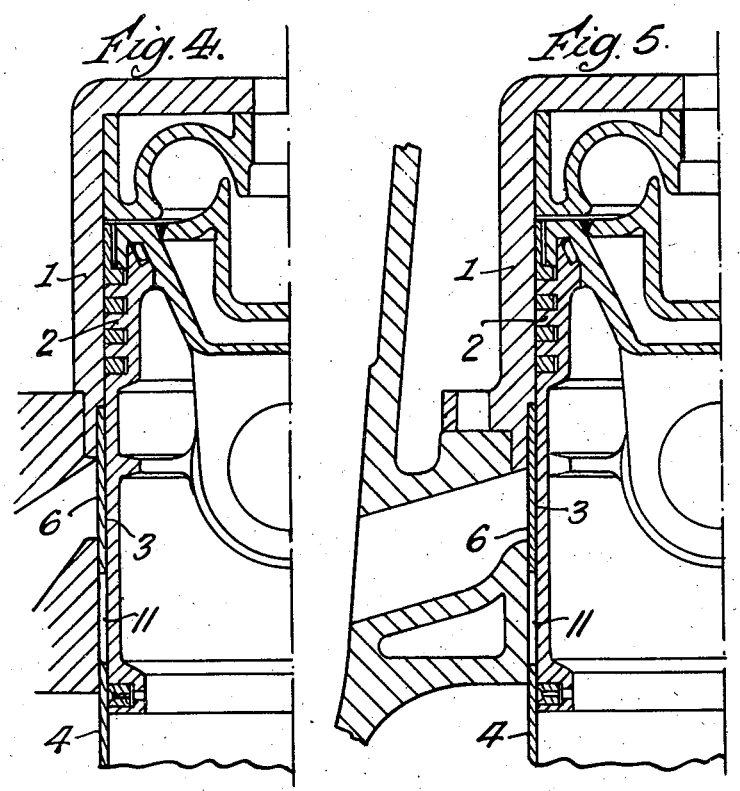
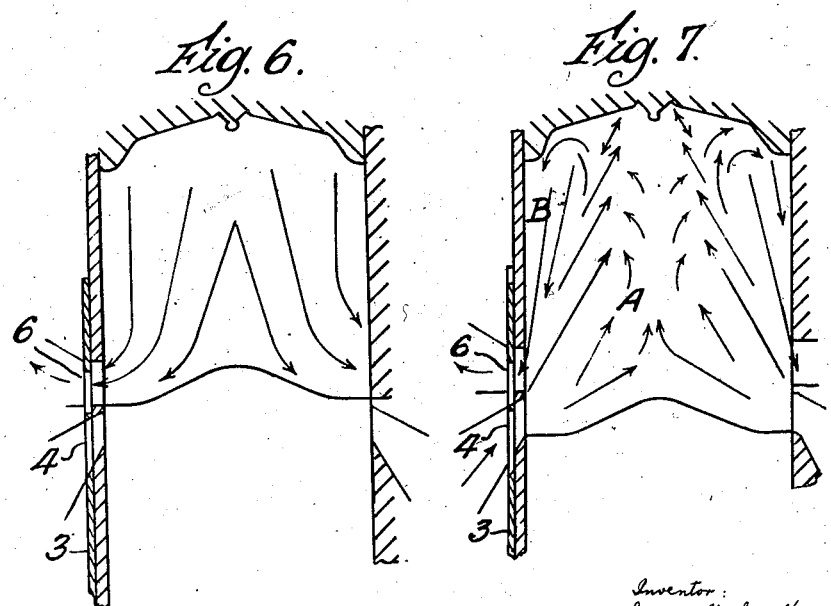

Dec. 8, 1942.    G. S. KAMMER    2,304,694
SCAVENGING OF TWO-STROKE SLEEVE VALVE INTERNAL COMBUSTION ENGINE
Filed Aug. 1, 1941    6 Sheets-Sheet 4

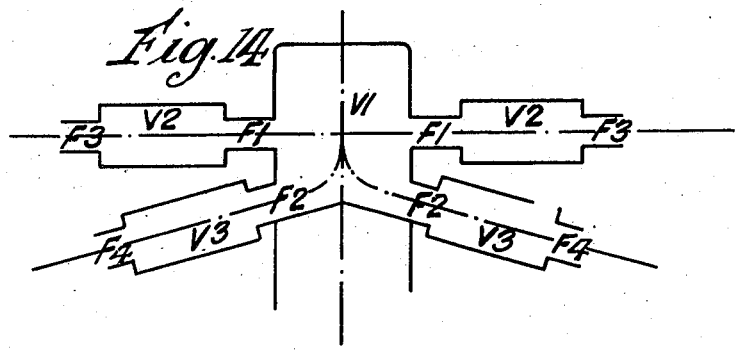
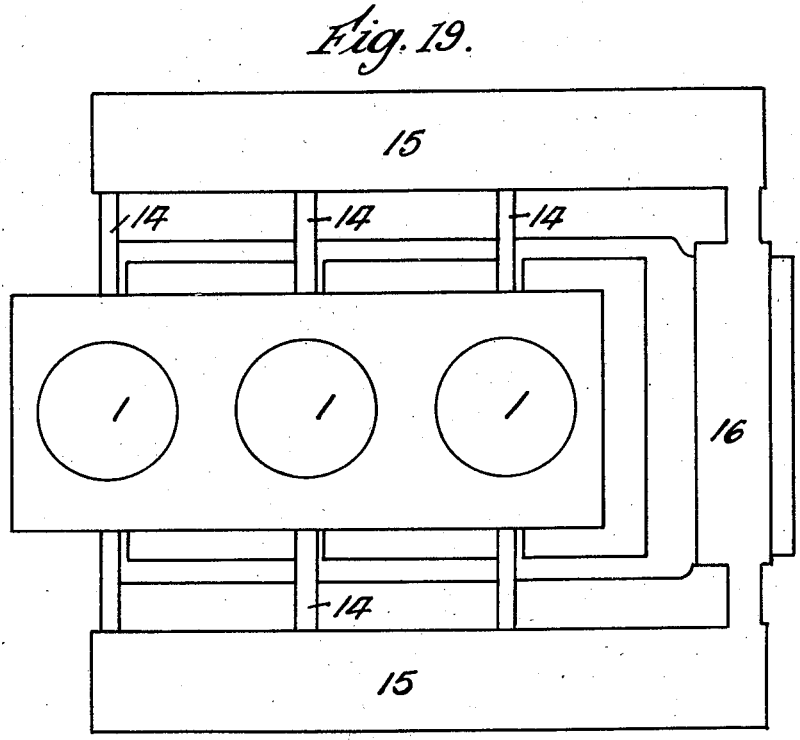

Patented Dec. 8, 1942

2,304,694

UNITED STATES PATENT OFFICE 2,304,694

SCAVENGING OF TWO-STROKE SLEEVE VALVE INTERNAL COMBUSTION ENGINES

George Stephen Kammer, High Austby, Middleton, near Ilkley, England

Application August 1, 1941, Serial No. 405,096
In Great Britain April 23, 1940

11 Claims. (Cl. 123—65)

The invention relates to the scavenging of two-stroke sleeve valve internal combustion engines, and more particularly to the arrangement of the ports and the timing of the operation so as to produce a very effective flow of the gases concerned in the scavenging operation, that is the products of combustion and the scavenging and charging air. It applies equally to petrol engines and oil engines and to engines having spark ignition and compression ignition.

In an engine of this kind the flow of gases is no longer in accordance with the laws governing a steady flow. The rapid changes of cross-sectional area combined with the inertia and elasticity of the gases cause an impulsive flow with a certain amount of oscillation. For instance, the exhaust gases leaving suddenly may rebound into the cylinder, and many inventions have been devised with the object of so timing the operation that the exhaust ports are closed at a suitable moment in relation to this oscillation.

While it has long been known that by suitably arranging the exhaust manifolds the fresh air charge can be advantageously influenced, the scavenging system (loop or reversed loop scavenging with piston controlled ports) was such that successful operation of the principle was restricted to one certain engine speed, and this suited the purpose well in certain cases, e. g. in marine engines. Others have found that the useful range of revolutions could be extended by delaying the vacuum period or by causing this period to be extended over a length of time. They used the partial vacuum so created to allow the fresh air charge to rush into the cylinder and to close the exhaust before an unwanted reiterated peak value of this exhaust rebound would otherwise be reached in the cylinder. This method was well applicable to cylinders with so called "Uniflow" scavenging. What happens in such a cylinder is that if the rebound were allowed to become effective very near to the closing of the inlet, part of the fresh air charge would again be forced out through the admission ports.

According to the present invention the cylinder admission ports are located near the outer end of the cylinder and are distributed around the whole circumference thereof and the exhaust ports are spaced away from the inner end of the cylinder, being distributed also around the whole circumference thereof. The timing is so arranged that the exhaust ports are brought to their maximum uncovered area before the admission ports commence to open or at least only shortly after they do so.

In one preferred arrangement the inlet ports are located immediately above the piston edge when the piston is at its outer dead centre and the exhaust ports are located immediately above them, the two kinds of ports being separated only by a thin dividing plate or wall. The sleeve can be arranged either between the piston and the cylinder or between the cylinder and the crankcase or the like, and, though the latter arrangement permits the use of a substantially shorter sleeve, the former arrangement will mostly be preferred on account of greater stability of the cylinder liner, better sealing and more appropriate cooling facilities.

In any case it is preferable, however, to use a sleeve valve drive giving a pronounced dwell at the inner dead centre position and a corresponding rapid movement to and from the outer dead centre position, though in certain cases, especially with a sleeve valve arranged between the cylinder and the crankcase, a single crank, driven at uniform engine speed, may be utilised.

Figure 2:
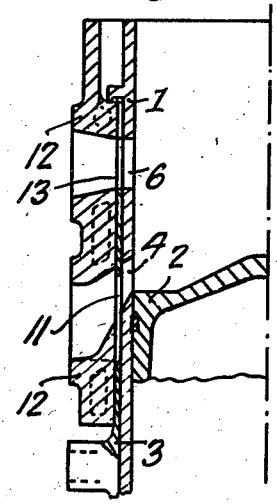
Figure 3:
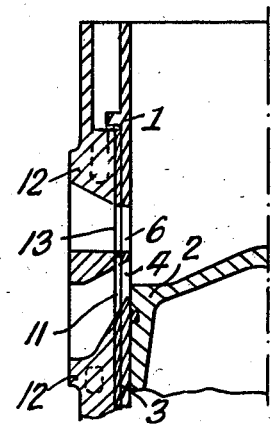
Figure 11:
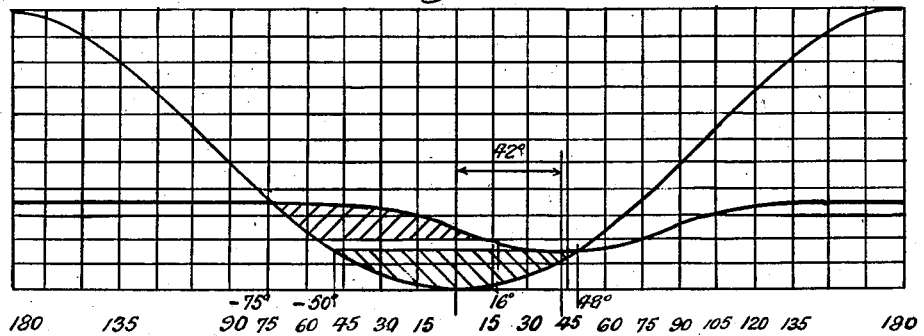
Figure 12:
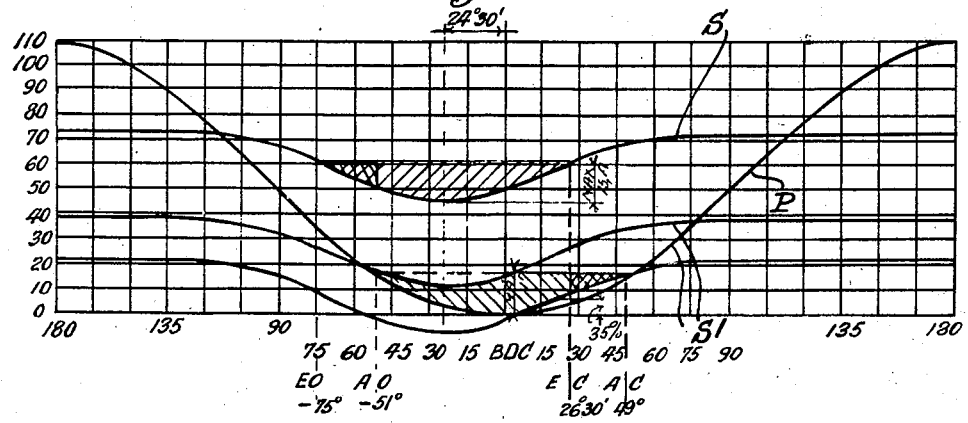
Figure 13:
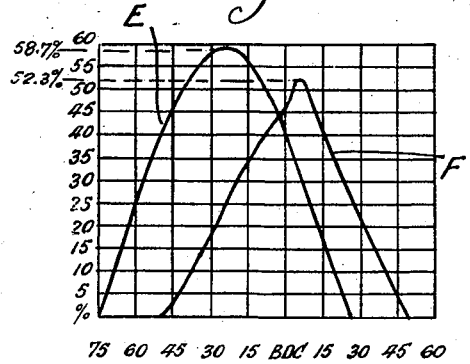

The accompanying drawings serve to illustrate the invention by various embodiments and explanatory diagrams, and therein Figure 1 is a part sectional elevation of the cylinder of an internal combustion engine according to the invention showing also some associated parts, Figures 2 to 5 are sections corresponding to Figure 1 showing alternative forms of construction according to the invention, Figures 6 and 7 are diagrams showing the gas flow in the cylinder of Figure 3 at two different instants, Figures 8 to 12 are timing diagrams of admission and exhaust, Figure 13 shows integrated time areas from Figure 12, Figure 14 is a simplified diagram of the spaces concerned with the movement of the gases, Figures 15 to 18 show the pressure and rarefaction waves at different stages, and Figure 19 is a diagrammatic arrangement of a three cylinder engine with exhaust turbocompressor.

Referring to Figure 1, the cylinder 1 houses the piston 2, and a sleeve valve 3 is movable between them. Admission ports 4 in the cylinder wall are connected to a blower 5, the lower edge of the ports being almost level with the inner edge of the piston when the latter is at its bottom or outer dead centre position. Exhaust ports 6 in the cylinder wall have their upper edge a little above the piston edge when midway between dead centres and their centre a little below that position.

Both sets of ports extend all the way around the circumference except for thin webs extending axially and radially for mechanical strength. One of these webs is shown at 7 in the exhaust system. The exhaust ports lead to an annular chamber 8 concentric with the cylinder, from which they pass out to the exhaust pipe. Similarly the admission ports are fed from a smaller annular chamber 9 communicating by a wide duct 10 with the blower 5.

The sleeve valve 3 has ports 11 to register with the admission ports 4 at the appropriate times, though the actual control of admission is effected by the inner edge of the piston. The end of the sleeve controls the exhaust, and on account of the lightness of the part of the sleeve above the ports 11 the bridges of metal between the ports may be made very narrow without risk of failure. For instance, they may occupy only 10% of the circumference in all. Consequently, with an engine of the proportions shown and having a stroke about 1½ times the cylinder bore, the area of the exhaust ports is as much as 82% of the piston area and that of the admission ports 79%, giving a very high volumetric efficiency.

Figure 8:
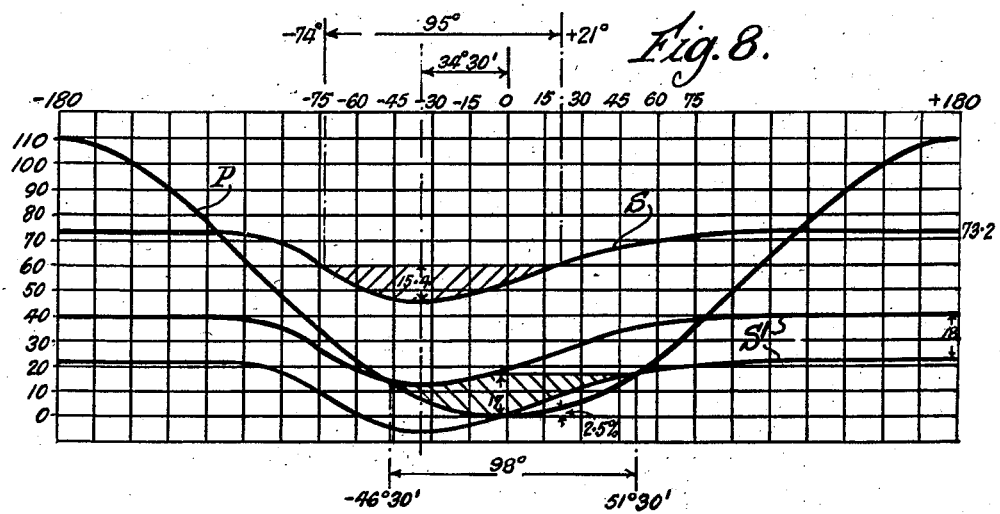

Figure 8 shows the timing of the engine of Figure 1. The axis of abscissae represents one complete revolution from one inner dead centre of the crank to the next, the graduations being in degrees before and after the outer dead centre. The curve P shows the movement of the upper edge of the piston, the stroke being 110 units on the vertical scale. The curve S shows the movement of the inner edge of the sleeve, which is driven by mechanism giving a cyclic variation of speed with a pronounced dwell at the inner position.

Reckoning from the outer dead centre position of the piston edge as zero, the edge of the sleeve at its inner position is at 73.2 units, and beyond or above this position the piston runs in a liner. The sleeve reaches its outermost position 34½° of crank angle ahead of the piston, and with the upper edge of the ports 6 at 60 units the exhaust is open from −74° to +21° with a maximum aperture of 15.4 units and a duration of 95° of crank angle. The curve of exhaust aperture is indicated by right-handed hatching.

The upper or inner edge of the ports 4 is at 17 units, while the ports 11 in the sleeve valve extend from 22 to 40 units in the innermost position of the sleeve, the movement of the ports 11 being shown by the curves S'. Admission is thus opened by cooperation of piston and sleeve at −46½° of crank angle and is closed at +51½°, a duration of 98°. The curve of admission aperture is indicated by left-handed hatching. It will further be noted that the exhaust closes when the piston has only moved 2.5% of its stroke inwards from the outer dead centre.

Figure 2 shows an alternative arrangement. Here the sleeve 3 is between the cylinder 1 and the crank case extension 12. The upper edge of the sleeve controls the exhaust, and the edge of the piston controls the admission, while the ports 11 in the sleeve are provided merely to clear the admission passage while the piston is off the ports 4.

Figure 9:
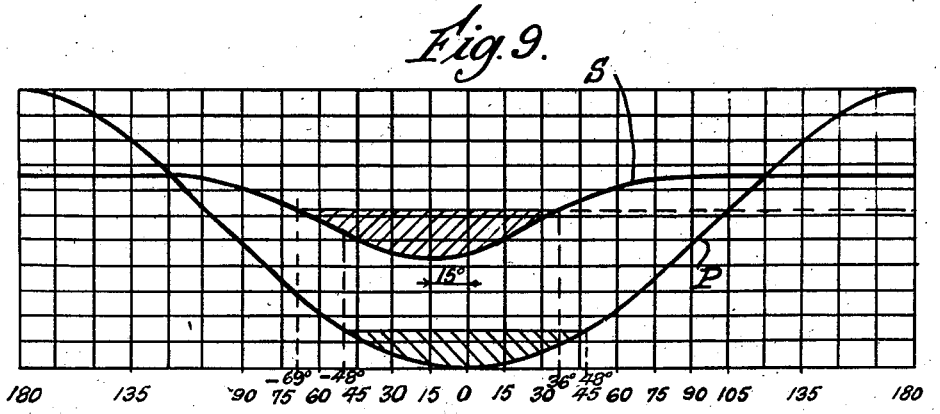
Figure 10:
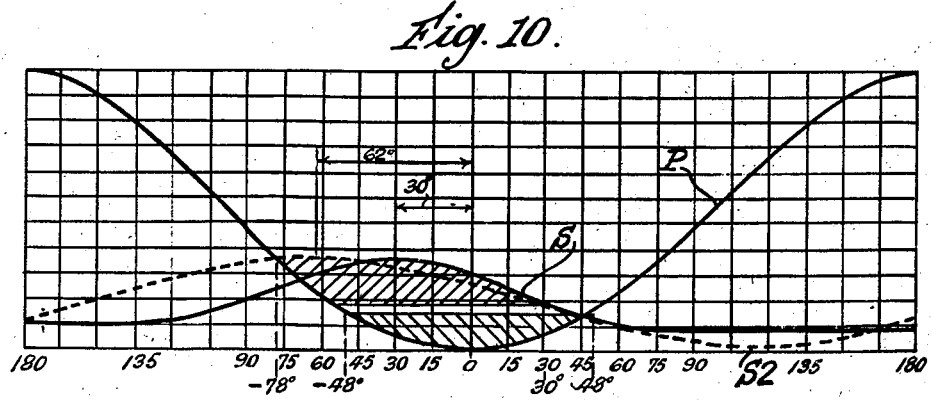

The timing diagram is given in Figure 9. The piston stroke is again 110 units, but the valve travel is 34 units. The valve is driven by the same mechanism as before and reaches its extreme outermost position 15° ahead of the piston. Exhaust opens at 69° before the outer dead centre and admission 48° before. Exhaust closes at 36° after dead centre and admission closes 48° after.

A further alternative is shown in Figure 3, in which the exhaust ports 6 are immediately above the admission ports 4, while the sleeve moves in the reverse direction as compared with the previous examples. Also the sleeve 3 is between the cylinder and the crank case extension 12. The piston stroke is 110 units and the valve travel 28 units, as shown in the timing diagram of Figure 10. The valve has admission ports 11 for clearance purposes, but it also has exhaust ports 13 having the function of closing the exhaust. In operation the exhaust is opened at −78°, the sleeve ports 13 being already partly open. The contrary movements of sleeve and piston give a very rapid increase of cross-sectional area, which reaches its maximum value before the admission ports commence to open at −48°. The exhaust is closed by the sleeve at +30°, and charging continues until the admission is closed by the piston at +48°. These figures are obtained with the sleeve reaching its innermost position at −30°.

The dotted curve S₂ is an alternative to the curve S with the sleeve driven in a sinusoidal motion. The travel is increased to 34 units and the phase lead is 62°. It will be noted that the exhaust area is not quite so favourable as with the full line curve, though even so there is a great advantage over previously known arrangements.

Figure 11 is an alternative timing diagram for the arrangement shown in Figure 3. Here the sleeve valve operates in the same direction as the piston but reaches its outermost position 42° after the piston and has a travel of only 21 units. The piston opens the exhaust at −75° and then the admission at −50°. The valve then closes the exhaust at +16° and finally the piston closes the admission at +48°.

The construction of Figure 4 is more like that of Figure 1 than those of Figures 2 and 3, the principal difference being in the shape of the passage near the admission and exhaust ports, as will be described later. The construction and operation will be clear from the previous description, and details of timing are shown in Figure 12. The valve reaches its outermost position 24½° before the piston and has a travel of 28 units. The exhaust opens at −75° and the admission at −51°, while the exhaust closes at +26½° and the admission at +49°. The results are slightly inferior to those of Figure 1 shown in the diagram of Figure 8, but are still very good, as is shown by the curves of Figure 13. These represent the area of port plotted against crank angle for an engine having bore and stroke equal. Curve E is for the exhaust ports and curve F for the admission ports. Of course with a proportionally longer stroke the percentages will be increased in proportion. Figure 5 only differs from Figure 4 in the shape of the passages near the ports and will be referred to later.

In the arrangement of Figure 3 the exhaust ports are located, as already mentioned, immediately above the admission ports, and the processes of gas flow will now be referred to. The piston uncovers the full area of exhaust ports before commencing to uncover the admission ports. The result will be that the exhaust gases will escape almost immediately as shown by the arrow-head lines in Figure 6, and their inertia will move them on in the exhaust pipe, leaving a comparatively low pressure behind them in the cylinder. At this moment, or after about 30 degrees of crank shaft movement from the commencement of exhaust opening, the piston starts rapidly to uncover the admission ports, and the scavenging air is admitted to the cylinder.

The scavenging air moves in the opposite direction to the path of the exhaust gases and is built up in a conical form within the cylinder as shown at A in Figure 7, so that the base of the cone is close to the piston and the taper reaches approximately and progressively up to the cylinder head. The top of the cone would then tend to travel further along the axis of the cylinder through the cylinder head. In the meantime the entering conical body of scavenging air displaces the exhaust gases towards the exhaust ports, so that the cylinder contents consist roughly of a cylindrical body of rarefied exhaust gases into which a conical wedge of scavenging air has been driven.

The top of the cone of scavenging air is however deflected from the cylinder head downwards and towards the periphery of the cylinder as more air enters the cylinder, as shown by the lines B in Figure 7. Thus another body is formed, with its base diametrically opposite to the base of the cone on the crown of the piston, and its circular apex at the exhaust ports, and as this proceeds the cylinder head deflects the incoming and onrushing scavenging air downwards along the cylinder walls, driving out the last residue of exhaust gases and providing a fresh charge. Hereafter the exhaust ports are closed and the admission ports kept open for a suitable period to allow for supercharging of the cylinder. The cylinder head is made of a suitable shape on its interior surface to guide the scavenging air in the manner described. This shape is shown in Figure 1, and an aternative is shown in Figures 6 and 7.

The gases entering the cylinder are influenced in their effect by the shape of the passages in the cylinder immediately preceding the ports. This statement relates to the entering scavenging air and also to the exhaust gases on their rebound. Thus Figures 2 and 3 show the passages associated with the admission ports tapered to project the entering air upwards and inwards. Figure 2 shows the exhaust passages tapered to cause the rebounding exhaust gases to enter radially, while Figure 3 provides for a downward component of movement on to the piston crown on account of the lower position of the exhaust ports.

In Figure 4 the exhaust passage is tapered and directed upwards towards the cylinder head like the admission passage in Figure 2, while in Figure 5 there is an abrupt reduction of area close to the ports, which may be advantageous in certain cases. In Figure 1 a similar abrupt reduction of area is provided in the scavenging air passage.

It is preferable to cause the exhaust rebound to give rise to a swirl. Therefore the partitions 7 in the exhaust passages are best set in planes not passing through the axis. The energy absorbed by the swirl is thus taken from the waste energy of the rebounding gas column instead of from the charging air.

The exhaust ports of the engine can be so arranged that the baffles or partitions 7 in the exhaust manifold commence at a certain distance from the cylinder walls, so that nothing will impede the progress of the reversing and rotating exhaust columns ad no area will be lost in the ports.

It will be clearly seen that by the methods described above the exhaust gas oscillations can be utilised in many ways. A very large portion of their energy is thus turned into useful work.

It will also be seen that, owing to the absolute time required at high revolutions for the return exhaust wave, of which the first rebound is the strongest, a very high degree of turbulence can be imparted to the air charge, owing to the first rebound only being effective due to shortness of time.

To assist in understanding the operation of the engine according to the invention reference will be made to the acoustic effects taking place in systems of resonators and illustrated by means of Figure 14. A central vessel $V_1$ representing the cylinder is in temporary communication with vessels $V_2$ having their axes perpendicular or nearly so to that of the vessel $V_1$. This communication is established through a finite length of pipe or opening $F_1$, and the vessels $V_2$ also communicate through openings $F_3$ with the atmosphere, which may be the actual atmosphere or an artificial one such as the receiver of an exhaust turbine. The vessels $V_2$ correspond to the chamber 8 of Figure 1. Similarly vessels $V_3$ representing the chamber 9 communicate by passages or openings $F_2$ with the vessel $V_1$ and by openings $F_4$ with the atmosphere.

If the vessel $V_1$ is brought into communication first with the vessels $V_2$ through openings $F_1$, resonance will occur between the two vessels $V_1$ and $V_2$, and its frequency will be determined by factors governing vibrations of a damped character in such a system. Obviously, the more abruptly the ports $F_1$ are opened and the greater is their maximum cross-sectional area, the larger will be the impulse setting the contents of vessel $V_1$ into motion. If there is no pressure difference between the contents of the two vessels, obviously no impulse will occur.

If, however, there is a pressure difference, but the vessels $V_2$ are the open atmosphere or any vessel of a size compared with which the volume of vessel $V_1$ can be considered very small, the resonance will follow the law applying to Helmholtzian resonator, i. e. it will assume the form of radiation into the vessel $V_2$. This cannot be attained in actual engines since it would imply a materialless cylinder. Obviously, therefore, oscillation of the mass of gas will be set up in this primary system about axes perpendicular to the axis of the vessel $V_1$.

If, after a while, the system is enlarged by the vessels $V_3$ through ports $F_2$, according to the laws in resonators, a secondary oscillation is set up, coaxially with vessel $V_1$.

Since the factors governing the resonance in the two systems are different and, particularly, the axes of resonance are so set that inter-resonance is unlikely to occur, it is convenient to refer to Figures 15 to 18 which schematically illustrate an engine cylinder constructed in accordance with such a system of resonators, comprising a sleeve valve 3, a piston 2, an exhaust pipe 14, an expansion vessel 8 and an air trunk 9.

Figure 15:
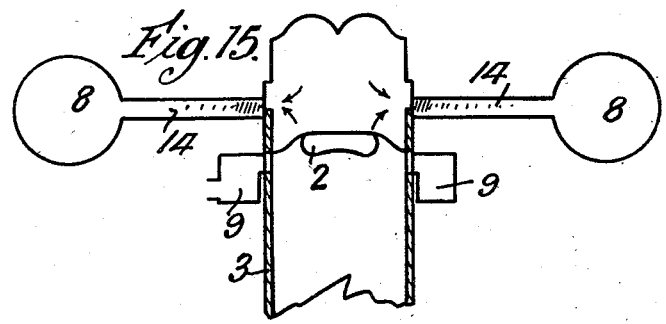

In Figure 15 the exhaust gases are shown escaping from the cylinder through ports which have been opened, and they travel along the exhaust pipe 14 towards the expansion vessel 8. There they are reflected after having compressed the contents of the exhaust pipe, and it is irrelevant whether a fresh charge has or has not, in the meantime, been admitted to the cylinder, for, if it has not been admitted, they will be reversed and show a picture similar to Figure 15, except that the direction of the gases will be opposite. Obviously, in this case they will compress each other and again assume their primary motion outwards away from the cylinder axis.

Figure 16:
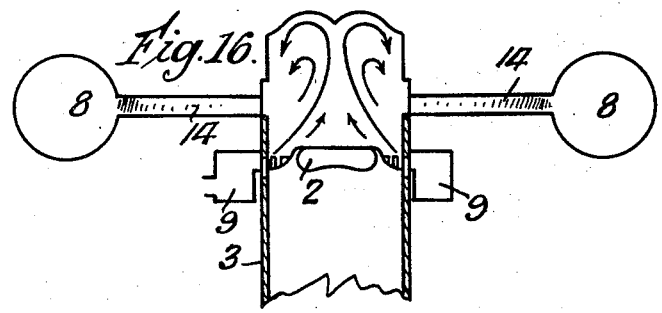

Figure 16 shows the conditions when the admission ports have commenced to open. Here, as in the other Figures 15 to 18, the gas flow is indicated by arrowhead lines, and the compression wave in the exhaust pipe is indicated by the shading lines being closer together. The wave has reached the outer end of the exhaust pipe and is being reflected.

Figure 17:
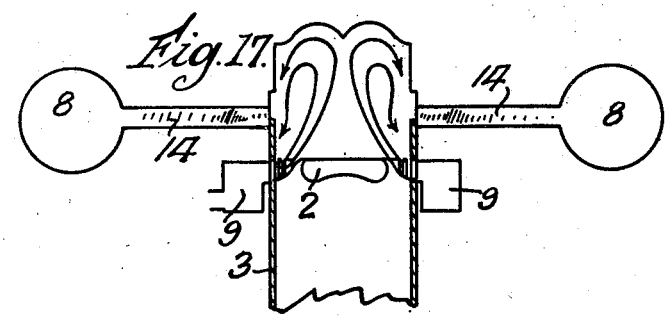

If a fresh charge has been admitted in the meantime, the gases will form a picture as shown in Figure 17 sooner or later, since they are reflected in a comparatively short interval of time and therefore, if there is a core of fresh charge, they will impinge on that, compress it or "waist" it and again reverse and flow outwards away from the cylinder axis.

This resonance will be repeated many times within the scavenging period, or as it is usually termed "transfer" period, since it is an object of the invention to accelerate the frequency of oscillations. It will assist the carrying into effect of this aim, if the exhaust pipe is made short, obviously a desideratum which it is easy to attain.

Figure 18:
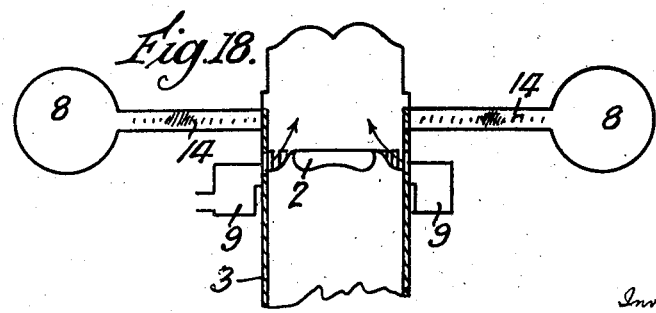

In Figure 18 a phase is shown, wherein the exhaust ports have already been closed and fresh charge is still permitted to enter the cylinder.

Figure 19 is given as an example of an engine constructed according to the invention. It shows diagrammatically a three cylinder two-stroke engine in which an artificial atmosphere is created by means of an exhaust turbine driven centrifugal blower. The exhaust pipes 14 are constructed as in Figures 15 to 18 and lead into a common receiver 15, from which the exhaust gases are led into the turbine 16. Doing work there, they pass the turbine blades and exhaust into the actual atmosphere. Since the superpressure of the charging air produced in such turbines does not exceed or only slightly exceeds the pressure available from the exhaust gases, the charging pressure will be similar to the back pressure, or at least of the same order.

Thus the system of resonators formed by the engine and the various air and gas passages connected to it will continue to function along the same lines as if the basis pressure were atmospheric. If we allow the maximum cylinder pressure to rise proportionately to the rise of the inlet manifold pressure above atmospheric, the intensity of oscillation and also its frequency will remain the same, except for the increased friction losses, which for the sake of convenience may be assumed as negligible, and the only alteration in the frequency of vibration will occur if the engine is operating at higher altitudes than sea level. In that case the efficiency of the turbine is raised and the efficiency of the blower is diminished. i. e. the total air available will be altered.

However, we have raised the mean indicated pressure of the system or in other words the amount of cubic feet by lbs. (ft.$^3$×lbs.) which pass through the engine cylinder during a complete cycle of operation, viz. during both the compression and expansion strokes, wherefore at sea level our output is bound to be higher than with a system operating under atmospheric conditions, whereas the conditions corresponding to atmospheric will only be encountered at a certain altitude above sea level.

The parasitic resonances, which in "Uniflow" systems would prevent a favourable balance at all engine speeds is ruled out according to the invention and consequently also the influence of altitude, since, as has been shown before and as is known, the frequency of vibration mainly depends on time.

A further explanation of the operations of exhaust scavenging will now be given. In the case of acoustic effects taking place in resonators or systems of resonators, if the mass to which resonance has to be imparted is small, as in the case of air or gases, comparatively small impulses will greatly increase the frequency of vibration of the mass. If a system of resonators is used, comprising two vessels interconnected by an opening or port, and the vessels are under different pressures, the opening of the port brings about the necessary impulse. Thereby discharge takes place from one vessel into the other vessel and, owing to friction of the mass (air or gases) on the wall of the vessel or vessels (engine cylinder, exhaust manifold and/or expansion vessel) assumes the form of a damped vibration.

In "Uniflow" or nearly uniflow type of cylinder scavenging the system of resonators is such that oscillation of the mass occurs coaxially with the cylinder. If the system of resonators is enlarged—as is the case when in an engine cylinder about to be evacuated of the exhaust gases the admission ports for the fresh charge are opened—the resonances may be subject to either of two effects. Either the amplitude of the vibration of the exhaust gases, which has already been set up before the admission ports are opened, is increased, or else the vibration is damped by the impulse ocurring when the mass of the secondary part of the resonator system (namely the fresh charge) is admitted to the cylinder.

The success of such a system of resonators depends mainly on time, which, of course relates to the velocity of the gases, the coefficient of damping of the primary system and the relative masses of the primary and secondary systems, i. e. to the amplitude or wavelength of the resonance or vibration.

To achieve a successful effect, it is obviously necessary to "tune" the resonator system, i. e. to bring about harmony of all the factors which determine the resonance space and consequently the fact whether the disturbance constituted by the necessary extension of the resonator system (viz. the necessity of admitting a fresh charge) will be a disturbance in a favourable or an unfavourable sense. (See Physikalishe Zeitschrift, vol. XXII, page 353 et seq.)

It is clear, therefore, that, on account of variations of engine speed, mass or gas contained in the cylinder and rapidity of the discharge, further, on account of the invariability of the size and shape of the engine and its connected passages, success in the effect can only be achieved within a limited speed range. Publications of makers of engines operating under such conditions show the correctness of this assertion.

The present invention can therefore, be best understood by the following. If the exhaust ports of the engine cylinder are, as in some of the examples described, located approximately midway between the bottom and top dead centre positions of the piston upper edge along the whole of the circumference of the cylinder, the resonator system, upon the opening of the exhaust ports, consists of the engine cylinder and a more or less unavoidable exhaust pipe. The vibrations in this resonator occur transversely to the axis of the cylinder and, within limits, assume the shape of an expanding and contracting annulus, at least in the vicinity of the cylinder wall as if it were a breathing annulus, which first expands and then contracts and may when contracted assume the shape of a thick disc comprising dense exhaust gases.

In partial dependence on the static back pressure of the exhaust system—which may be increased by placing an exhaust gas turbine in the exhaust system—the vibration will continue to follow the law holding for resonators. We may conveniently investigate that period first, which comprises the primary system only, i. e. before the admission ports have been opened.

As already mentioned, the contracting annulus may assume the shape of a thick disc, and its thickness will be substantially equal to the height of exhaust ports open at the time of contraction of the annulus. This disc, of course, consists of a reflected mass of exhaust gases, and, since the exhaust ports are arranged around the whole circumference of the cylinder, the velocity and the direction of one half of their sum, or in other words, the mass of exhaust gases right or left of the axis of symmetry of the cylinder, will be the opposite of those on the other.

In other words, again, no matter what the amplitude or the frequency of oscillation in this resonator is or may be, damping will occur ipso facto.

When the resonator system is enlarged by opening the admission ports, an alternative suction and expulsion effect is exercised by the annulus of exhaust gases within itself, upon the fresh charge which slides through the annulus, but also the fresh charge will form a cushion or a damping effect on the oscillation or "breathing" of the annulus.

It can be arranged that the length within which the annulus vibrates, i. e. the height of the cylinder divided by the annulus, is small compared with the length measured from the cylinder axis to the point of reflection of the exhaust gases, without necessarily resorting to definite lengths of exhaust pipes. Obviously, about half the piston stroke is a small length as compared with even the shortest exhaust pipe.

If we recall the phenomenon encountered with tuning forks held, when vibrating, above an empty cylindrical vessel, we may remember that the tone of the fork can hardly be heard. Upon gradually filling the vessel with water, there is a certain point of filling at which the tone resounds most strongly. That is, by shortening the column which has to be set into vibration, we were able to increase the intensity of the vibration itself. In these cases we find that the column of air has a length of ½ or 3½ or 5½ and so on, where 1 denotes the wavelength of the note given by the tuning fork. Similar effects can take place in an engine cylinder constructed in accordance with this invention.

It is clear that, owing to the non-coincidence of the axes of the two vibrations, a much greater freedom is achieved in fixing the timing of the gas flow.

The quasi-polarizing effect of the two vibrations precludes the possibility of intermixing of the two gaseous substances, which during the scavenging process are in vehement oscillatory motion in the shape of bodies of varying dimensions and shapes. Also, owing to the latter fact, any resonance between the two separate oscillations cannot occur, or is extremely unlikely to occur, whereas in uniflow scavenging it is almost unavoidable.

This invention, therefore, permits the use, as stated further above, of exhaust turbine driven blowers in connection with two-stroke engines in which the rate of port area increase would otherwise result in intermittent impulses on the turbine blades, if a pipe system could by any means be devised to permit equal filling of all cylinders of a multi-cylinder engine.

Since in an engine according to the invention the length of the exhaust pipe is practically without influence on the scavenging and charging process, it is possible to use short pipes connecting the exhaust ports to a common receiver or expansion vessel, which may conveniently be the exhaust pipe itself, so that the primary pipe, which alone determines the frequency of the vibration from the exhaust system side, may be equal for all cylinders and the receiver or expansion vessel may lead to all the turbine nozzles, instead of branching this pipe to a given number of nozzles only, receiving their impulses from a certain number of cylinders only.

Moreover, when the phase of the exhaust gas oscillation changes on account of varying back pressure in front of the turbine nozzles, this cannot cause any disturbance in the charging process, but will only alter some factors in the resonance conditions for that particular system.

The changes which thus take place are similar to those which occur with the changes of atmospheric pressure, as encountered for example in an aircraft engine not fitted with a turbine when climbing from sea level to a considerable altitude. Thus we can regard the density of the contents of the receiver or expansion vessel as that which would be encountered in a denser atmosphere than the actual one and, in turn, the actual atmosphere as one which, proportionately, we should encounter at higher altitudes.

Evidently, the benefits of a high rate of port area increase will be felt both in dense and in rare atmospheric surroundings, and therefore comparative rarefactions will occur in the course of the vibration of the exhaust gas annulus within it. However, the denser the fresh charge, the higher the value attained by the "line of atmosphere," as if it were in a graphical demonstration in a system of coordinates.

Therefore, by arranging an exhaust turbine driven blower in connection with this invention, we obtain a super-atmospheric process, the zero-line value of which is, as indicated, above the pressure of the atmosphere, but within which the same natural laws govern the gases as in the actual atmosphere, irrespective, of course, of whether we submit the engine to its influence at sea-level or at altitude.

Whereas in the case of uniflow scavenging the altering of the phase of oscillation may upset the conditions for obtaining the best scavenging and charging effect, the same cannot happen in an engine working according to the principles of this invention.

To achieve this object the frequency of all oscillations in the system is accelerated over the known systems in contradistinction to the systems in which these oscillations are retarded, and, particularly, the axes of the two oscillations or vibrations are so set that any inter-resonance cannot occur, or at least is very unlikely.

The technical advance provided by the invention can therefore be expressed by saying that, by creating a system of resonators within which two separate vibrations are set up at right angles to each other and by accelerating the frequency of these vibrations, considerable independence is achieved with regard to best charging values at different engine speeds and different altitudes at and above sea level. Also a simplification of the exhaust manifold system is achieved in connection with exhaust turbines, which, especially in engines intended for aircraft propulsion, works out in considerable saving of weight and space. In engines, fitted with turbo chargers, wherein the use of a single turbine was impracticable on account of the large number of cylinders, this further permits a reduction of weight, since it is possible according to the invention to use one single turbine for any number of cylinders. Thus more freedom is allowed also in the design of the turbine and blower, a higher efficiency of these elements is achieved and the bulk is reduced.

What I claim is:

1. A two-stroke sleeve valve internal combustion engine having a cylinder with admission and exhaust ports distributed all around the circumference, a liner in the cylinder, with ports corresponding to those of the cylinder, a crank case extension to carry the liner, a sleeve valve between the crank case extension and the liner and a piston working in the liner, the liner admission ports being located near the outer end of the part of the liner swept by the piston and the liner exhaust ports away from the inner end of the said part.

2. A two-stroke sleeve valve internal combustion engine having a cylinder with admission and exhaust ports distributed all around the circumference, a liner in the cylinder, a sleeve valve of approximately the same diameter and bore as the liner and located almost to butt against the liner when at its inmost position, and a piston working within the sleeve valve and the liner, the cylinder admission ports being located adjacent to the outer end of the space left by the piston when at its outermost position and the cylinder exhaust ports being located away from the inner end of the said space.

3. A two-stroke sleeve valve internal combustion engine having a cylinder with admission and exhaust ports distributed all around the circumference, a piston working in the cylinder, the admission ports being located near the outer end of the part of the cylinder swept by the piston and the exhaust ports a substantial portion of the stroke away from the inner end of the said part, the admission ports terminating passages in the cylinder wall tapered towards the ports and pointing in a direction towards the inner end of the cylinder, and a reciprocable sleeve valve operatively associated with said piston and said admission and exhaust ports for opening and closing the exhaust ports before the admission ports respectively during expansion strokes and compression strokes of the piston.

4. A two-stroke sleeve valve internal combustion engine having a cylinder with admission and exhaust ports distributed all around the circumference, a piston working in the cylinder, the admission ports being located near the outer end of the part of the cylinder swept by the piston and the exhaust ports a substantial portion of the stroke away from the inner end of the said part, and the admission ports terminating passages in the cylinder wall having their walls away from the inner end of the cylinder oblique inwards and then nearly coaxial with the cylinder to constitute a gradual reduction of cross-section nearly to the ports and then an abrupt reduction of cross-section, and a reciprocable sleeve valve operatively associated with said piston and said admission and exhaust ports for opening and closing the exhaust ports before the admission ports respectively during expansion strokes and compression strokes of the piston.

5. A two-stroke sleeve valve internal combustion engine having a cylinder with admission and exhaust ports distributed all around the circumference, a piston working in the cylinder, the admission ports being located near the outer end of the part of the cylinder swept by the piston and the exhaust ports a substantial portion of the stroke away from the inner end of the said part, and the exhaust ports terminating passages in the cylinder wall tapered towards the ports and pointing approximately radially inwards, and a reciprocable sleeve valve operatively associated with said piston and said admission and exhaust ports for opening and closing the exhaust ports before the admission ports respectively during expansion strokes and compression strokes of the piston.

6. A two-stroke sleeve valve internal combustion engine having a cylinder with admission and exhaust ports distributed all around the circumference, a piston working in the cylinder, the admission ports being located near the outer end of the part of the cylinder swept by the piston and the exhaust ports a substantial portion of the stroke away from the inner end of the said part, and the exhaust ports terminating passages in the cylinder wall tapered towards the ports and directed towards the inner end of the cylinder, and a reciprocable sleeve valve operatively associated with said piston and said admission and exhaust ports for opening and closing the exhaust ports before the admission ports respectively during expansion strokes and compression strokes of the piston.

7. A two-stroke sleeve valve internal combustion engine having a cylinder with admission and exhaust ports distributed all around the circumference, a piston working in the cylinder, the admission ports being located near the outer end of the part of the cylinder swept by the piston and the exhaust ports a substantial portion of the stroke away from the inner end of the said part, and the exhaust ports terminating passages in the cylinder wall tapered towards the ports and having a sudden reduction of cross-section near the ports, and a reciprocable sleeve valve operatively associated with said piston and said admission and exhaust ports for opening and closing the exhaust ports before the admission ports respectively during expansion strokes and compression strokes of the piston.

8. A two-stroke sleeve valve internal combustion engine having a cylinder with admission and exhaust ports distributed all around the circumference, a piston working in the cylinder, the admission ports being located near the outer end of the part of the cylinder swept by the piston and the exhaust ports a substantial portion of the stroke away from the inner end of the said part, and the exhaust ports terminating a passage subdivided by thin partitions of which the planes do not pass through the cylinder axis, and a reciprocable sleeve valve operatively associated with said piston and said admission and exhaust ports for opening and closing the exhaust ports before the admission ports respectively during expansion strokes and compression strokes of the piston.

9. A two-stroke sleeve valve internal combustion engine having a cylinder with admission and exhaust ports distributed all around the circumference, a piston working in the cylinder, the admission ports being located near the outer end of the part of the cylinder swept by the piston and the exhaust ports a substantial portion of the stroke away from the inner end of the said part, and the exhaust ports terminating a passage subdivided by thin partitions having their inner ends short of the cylinder bore, and a reciprocable sleeve valve operatively associated with said piston and said admission and exhaust ports for opening and closing the exhaust ports before the admission ports respectively during expansion strokes and compression strokes of the piston.

10. A two-stroke sleeve valve internal combustion engine having a cylinder with admission and exhaust ports distributed all around the circumference and a piston working in the cylinder, the admission ports being located near the outer end of the part of the cylinder swept by the piston and the exhaust ports away from the inner end of the said part, and the ports terminating passages of such a shape that the axes of the resonance vibrations due to the exhaust and the admission are at a substantial angle.

11. A two-stroke sleeve valve internal combustion engine having a cylinder with admission and exhaust ports distributed all around the circumference and a piston working in the cylinder, the parts being so arranged that the static pressure at the cylinder ports varies many times during a single scavenging operation.

GEORGE STEPHEN KAMMER.